Figure 1:
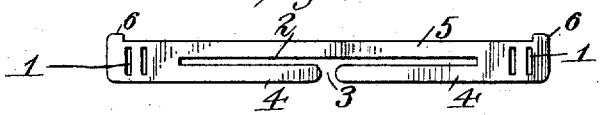

N. C. EDWARDS.

SKIRT SUPPORTER.

APPLICATION FILED AUG. 10, 1907.

Reissued Sept. 20, 1910. 13,152.

Witnesses:
Christ Feinle.
Harry D. Rapp.

Nora C. Edwards Inventor.
By Emil Neuhart,
Attorney.

THE NORRIS PETERS CO., WASHINGTON, D. C.

UNITED STATES PATENT OFFICE.

NORA C. EDWARDS, OF BUFFALO, NEW YORK.

SKIRT-SUPPORTER.

13,152. Specification of Reissued Letters Patent. Reissued Sept. 20, 1910.

Original No. 730,751, dated June 9, 1903, Serial No. 123,802. Application for reissue filed August 10, 1907. Serial No. 388,064.

*To all whom it may concern:*

Be it known that I, NORA C. EDWARDS, a citizen of the United States, and resident of Buffalo, in the county of Erie and State of New York, formerly a resident of Spooner, in the county of Washburn and State of Wisconsin, have invented new and useful Improvements in Skirt-Supporters, of which the following is a specification.

This invention relates to certain new and useful improvements in skirt-supporters.

The invention aims to provide a skirt-supporter which shall be simple of construction, strong, durable, and efficient in use and comparatively inexpensive to manufacture.

To this end the invention consists in the novel combination and arrangements of parts hereinafter more specifically described, illustrated in the accompanying drawings, and particularly pointed out in the claims hereto appended.

In describing the invention in detail reference is had to the accompanying drawings, forming a part of this specification, wherein like reference characters denote corresponding parts throughout the several views, and in which,—

Figure 2:
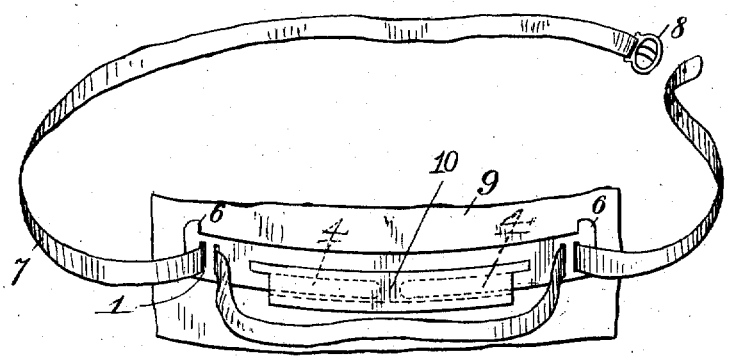
Figure 3:
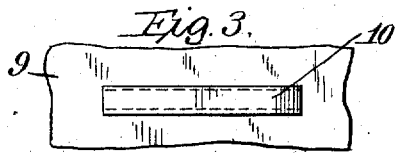
Figure 4:
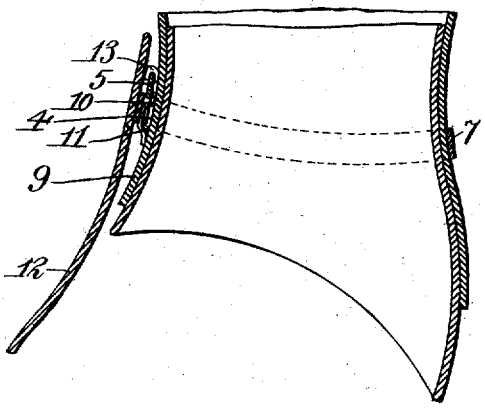

Figure 1 is a front elevation of the supporting-plate. Fig. 2 is an elevation of the skirt-supporter when attached in position to a garment, the latter being shown in part. Fig. 3 is a detail view of a portion of a waist, showing the stay-piece forming a pocket into which extend the arms of the supporting-plate; and Fig. 4 is a sectional detail of the skirt-supporter attached in position to a garment.

Referring to the drawings by reference characters, the supporting-plate is constructed of an oblong piece of flexible material, preferably metal, which is provided at each end with a pair of vertically-extending apertures or slots 1. The supporting-plate is cut away approximately centrally thereof to form an elongated longitudinally-extending slot 2, communicating with a vertically-extending opening 3, arranged approximately centrally of the plate. This cutting away of the plate provides a substantially T-shaped slot and forms the lower portion of the plate into a pair of oppositely disposed straight attaching-arms 4. The latter are adapted to connect the plate to a waist in a manner hereinafter referred to. The upper portion of the plate above the arms 4, which is indicated by the reference character 5, is termed a "supporting-bar", the function of which will be hereinafter set forth, and the plate at each corner of this upper portion is provided with a vertically-extending lug or projection 6, the function of which will be hereinafter referred to.

The reference character 7, denotes a belt or band which is adapted to be passed around the waist of a person and through the openings 1 at each end of the supporting-plate so that it lies over the attaching-arms 4, but if desired the belt or band may be otherwise applied to the supporting-plate. One end of the belt or band carries a buckle 8, which is adapted to be engaged by the apertured end of the belt or band for connecting the ends thereof together when in position around the waist of a person.

The supporting-plate is adapted to be attached to the back of the waist, (indicated by the reference character 9,) and the waist has connected thereto a stay-piece 10, forming a pocket 11 arranged crosswise on the waist, so that the attaching-arms 4 can be inserted in the pocket and connect the supporting-plate to the waist.

The reference character 12 denotes the skirt, provided on the top edge thereof with hooks 13, the latter being adapted to connect the skirt with the bar 5 of the supporting-plate. When the skirt is attached to the bar 5 in the manner just set forth, the lugs 6 at each end of the supporting-plate prevent the hooks 13 from riding off the same, but when the waist-band of the skirt is to be drawn tightly around the waist of the wearer, said lugs may be dispensed with.

Before the supporting-plate is attached to the waist the belt or band is connected to the plate, so that the belt or band will pass through the openings 1 in the plate and will lie against the outer face thereof, or the band may be otherwise applied to said plate.

It will be evident from the foregoing description, taken in connection with the accompanying drawings, that I have devised a simple, inexpensive, and novel form of skirt-supporter, one that can be readily attached in position, and it will, furthermore, be evident that changes, variations, and modifications may be resorted to without departing from the spirit of the invention or sacrificing any of its advantages, and I therefore do not wish to restrict myself to the details of construction hereinbefore described, and shown in the accompanying drawings, but reserve the right to make such changes, variations, and modifications as come properly within the scope of the following claims.

Having thus fully described my invention, what I claim as new, and desire to secure by Letters Patent, is,—

1. A skirt-supporter comprising a substantially rectangular plate provided with end openings and a pair of lugs and further provided with a T-shaped opening forming a pair of attaching-arms, and a waist-belt extending through the said end openings and lying against one face of said plate.

2. A skirt-supporter comprising a plate provided with a T-shaped opening forming a pair of attaching-arms adapted to enter a pocket in a waist, and a waist-belt secured to said plate and adapted to encircle the waist of a person for securing the plate thereto.

3. A skirt-supporter comprising a plate provided with a pair of oppositely-disposed attaching-arms adapted to enter a pocket in a waist, and a belt secured to said plate and lying lengthwise over said attaching arms.

In testimony whereof, I have affixed my signature in the presence of two subscribing witnesses.

NORA C. EDWARDS.

Witnesses:
ELLA C. PLUECKHAHN,
EMIL NEUHART.